(12) United States Patent
Kronstadt et al.

(10) Patent No.: US 8,783,126 B2
(45) Date of Patent: Jul. 22, 2014

(54) MANUAL TRANSMISSION WITH A GEARSHIFT LOCKING MECHANISM AND METHOD

(75) Inventors: Victor Kronstadt, Hagerstown, MD (US); Earl E. Duffey, Waynesboro, PA (US)

(73) Assignee: Mack Trucks, Inc., Greensboro, NC (US)

( * ) Notice: Subject to any disclaimer, the term of this patent is extended or adjusted under 35 U.S.C. 154(b) by 796 days.

(21) Appl. No.: 12/375,937

(22) PCT Filed: Sep. 1, 2006

(86) PCT No.: PCT/US2006/034339
§ 371 (c)(1),
(2), (4) Date: Jan. 31, 2009

(87) PCT Pub. No.: WO2008/027054
PCT Pub. Date: Mar. 6, 2008

(65) Prior Publication Data
US 2010/0000360 A1    Jan. 7, 2010

(51) Int. Cl.
*F16H 63/36*  (2006.01)
*F16H 63/10*  (2006.01)
*F16H 59/04*  (2006.01)

(52) U.S. Cl.
CPC ................ *F16H 63/36* (2013.01); *F16H 63/10* (2013.01); *F16H 59/04* (2013.01)
USPC ..................................... 74/473.25; 74/473.26

(58) Field of Classification Search
USPC ............... 74/473.21, 473.24, 473.25, 473.26, 74/473.36, 473.35
See application file for complete search history.

(56) References Cited

U.S. PATENT DOCUMENTS

| | | | |
|---|---|---|---|
| 1,830,797 A * | 11/1931 | Lapsley ..................... | 74/473.24 |
| 3,581,594 A | 6/1971 | Longshore | |
| 3,937,100 A * | 2/1976 | Huffman et al. ........... | 74/473.21 |
| 4,550,628 A | 11/1985 | Yarnell | |
| 4,567,785 A * | 2/1986 | Reynolds et al. .......... | 74/473.24 |
| 5,038,632 A * | 8/1991 | Watson ..................... | 74/473.26 |
| 6,374,686 B1 | 4/2002 | Weston | |
| 2003/0140722 A1* | 7/2003 | Kramer et al. ............. | 74/473.25 |

FOREIGN PATENT DOCUMENTS

JP    52153066    12/1977

OTHER PUBLICATIONS

International Search Report for corresponding International Application PCT/US2006/034339.

* cited by examiner

*Primary Examiner* — David M Fenstermacher
*Assistant Examiner* — Terence Boes
(74) *Attorney, Agent, or Firm* — WRB-IP LLP

(57) ABSTRACT

A manual transmission with a gearshift locking arrangement includes a rail having a shifter having a slot between forward and rear ears of the shifter, the rail being movable between rail forward and rear positions. The manual transmission with a gearshift locking arrangement also includes forward and rear engagement members disposed at positions corresponding to the rail forward and rear positions. A shift lever is also provided, an engaging portion of the shift lever being adapted to be disposed in the slot, the shift lever being adapted to move the rail between the rail forward and rear position, the engaging portion being engageable with the forward engagement member when the rail is in the rail forward position and the engaging portion being engageable with the rear engagement member when the rail is in the rail rear position.

16 Claims, 3 Drawing Sheets

MANUAL TRANSMISSION WITH A GEARSHIFT LOCKING MECHANISM AND METHOD

BACKGROUND AND SUMMARY

The present invention relates generally to manual transmissions and, more particularly, to manual transmissions having gearshift locking arrangements.

Unintended disengagement in a manual transmission can result from shift lever inertia forces causing the transmission to disengage from the selected gear position or from a combination of forces both internal to the transmission as well as external. The lever inertia forces usually result from traversing uneven terrain or from power train excitation causing excessive motion of the gear shift lever. Internal forces can be the result of manufacturing deficiencies or unequal load sharing within multi counter shaft units which is a common construction feature of today's heavy duty truck transmissions.

Unintended disengagement can be source of operator irritation, not to mention more serious concerns regarding safe vehicle operation. Over the years various types of locking devices have been employed in attempts to overcome these problems. Such locking devices are usually confined to modifying the jaw clutch components which are used to engage a particular gear to the transmission main or output shaft to produce a locking effect. This can be accomplished by tapering the engaging internal and external teeth to produce a dovetail joint type of connection which results in an axial force between the two which causes them remain engaged. While this is effective, the magnitude of the engaging force is dependent upon the load on the power train. Under heavy loads the engaging force is greater. Under light loads the effectiveness of the engaging force is diminished and therefore cannot always be employed to overcome disengagement problems under all types of conditions. Other types of tooth modifications have been utilized over the years but have met with mixed success or created other problems such as durability or manufacturing issues and for those reasons these solutions are not widely employed.

Attempts have been made to control the shift lever inertia forces but these usually interfere with the ability to shift the transmission resulting from the addition of friction or damping forces which must be overcome when shifting from gear to gear.

It is desirable to provide a gearshift locking arrangement that is simple in construction and that minimizes interferences with use of the gearshift.

In accordance with an aspect of the present invention, a manual transmission with a gearshift locking arrangement comprises a first rail having a first shifter having a first slot between first forward and rear ears of the first shifter, first forward and rear engagement members being provided on the first forward and rear ears of the first shifter, a second rail having a second shifter having a second slot between second forward and rear ears of the second shifter, and a shift lever, an engaging portion of the shift lever being movable between the first slot and the second slot, the shift lever being adapted to move the second rail between a second rail forward and rear position when the engaging portion is in the second slot, the engaging portion being engageable with the first forward engagement member when the second rail is in the second rail forward position and the engaging portion being engageable with the first rear engagement member when the second rail is in the second rail rear position.

In accordance with another aspect of the present invention, a shift rail assembly for a gearshift mechanism comprises a shift rail, and a shifter mounted on the shift rail, the shifter comprising forward and rear ears defining a slot for receiving a portion of a gearshift lever, and forward and rear engagement members on the forward and rear ears for engaging an engagement portion of the gearshift lever.

In accordance with yet another aspect of the present invention, a method of operating a gearshift mechanism comprises moving an engaging portion of a shift lever between a first slot in a first shifter of a first rail, the first slot being disposed between first forward and rear ears of the first shifter, and a second slot in a second shifter of a second rail, the second slot being disposed between second forward and rear ears of the second shifter, using the shift lever, moving the second rail one of forwardly and rearwardly relative to the first rail, and, when the second rail is moved forwardly, engaging with the engaging portion a first forward engagement member provided on the first forward ear of the first shifter and, when the second rail is moved rearwardly, engaging with the engaging portion a first rear engagement member provided on the first rear ear of the first shifter.

In accordance with yet another aspect of the present invention, a manual transmission with a gearshift locking arrangement comprises a rail having a shifter having a slot between forward and rear ears of the shifter, the rail being movable between rail forward and rear positions, forward and rear engagement members disposed at positions corresponding to the rail forward and rear positions, and a shift lever, an engaging portion of the shift lever being adapted to be disposed in the slot, the shift lever being adapted to move the rail between the rail forward and rear position, the engaging portion being engageable with the forward engagement member when the rail is in the rail forward position and the engaging portion being engageable with the rear engagement member when the rail is in the rail rear position.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
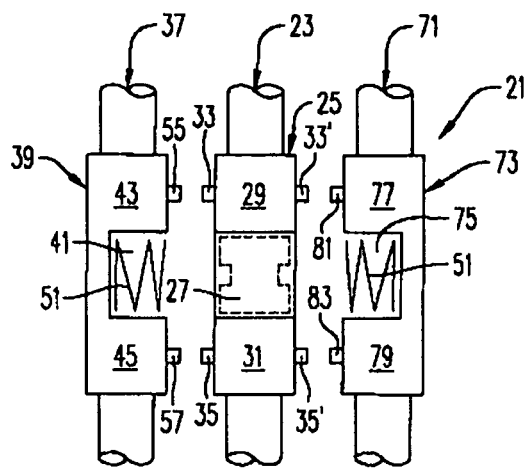
FIGS. 1A-1I schematically show a manual transmission with a gearshift locking arrangement in different positions according to an embodiment of the present invention.

A manual transmission 21 with a gearshift locking arrangement is shown in FIGS. 1A-1I. The transmission 21 comprises what shall be denominated as a first rail 23, sometime referred to as a shift rod, having what shall be denominated as a first shifter 25. The first shifter 25 has a first slot 27 between first forward and rear ears 29 and 31, respectively, of the first shifter. First forward and rear engagement members 33 and 35, respectively, are provided on the first forward and rear ears 29 and 31 of the first shifter 25. A second rail 37 having a second shifter 39 with a second slot 41 between second forward and rear ears 43 and 45, respectively, of the second shifter is also provided. It will be appreciated that substantially all components of the manual transmission 21 except those described herein for locking the gearshift in position can be of a conventional type. As a result, the manual transmission 21 according to the present invention is believed to be relatively simple to provide and to use.

Figure 2:
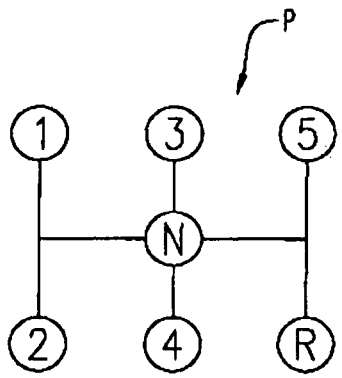
FIG. 2 shows a gearshift pattern of the type usable with a gearshift locking arrangement such as is shown in FIGS. 1A-1I.
Figure 4:
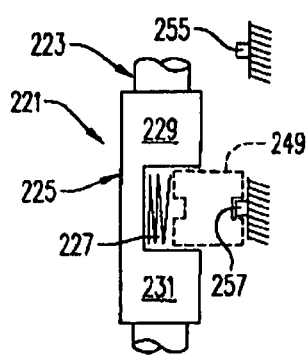
FIG. 4 schematically show a manual transmission with a gearshift locking arrangement according to yet another embodiment of the present invention.
Figure 3:
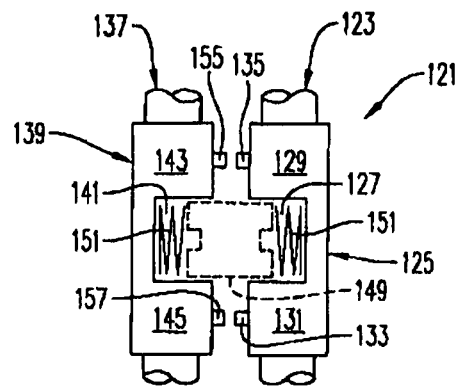
FIG. 3 schematically shows a manual transmission with a gearshift locking arrangement according to another embodiment of the present invention.

The transmission 21 also comprises a shift lever 47 (FIG. 5) having an engaging portion 49 (shown in phantom in FIGS. 1A-1I) that is movable between the first slot 27 and the second slot 41. An illustrative embodiment of the manual transmission 21 with a gearshift locking arrangement is shown in FIGS. 1A-1I whereby the shift lever 47 can be operated to move shift between five forward gears and one rear gear of a vehicle according to a shifting pattern P such as is shown in FIG. 2. It will be appreciated, however, that the manual transmission with a gearshift mechanism can be used in conjunction with transmissions having different shifting patterns and different numbers of gears. For example, FIG. 3 shows a manual transmission 121 with a gearshift locking arrangement with two shift rails 123 and 137. As seen in FIG. 4, the gearshift locking arrangement according to an aspect of the present invention could also be used with a transmission 221 having only a single shift rail 223, such as where an engaging portion 249 is disposed in or movable into a slot 227 in a shifter 225 and engages with engagement members 255 and 257 mounted to some structure, not necessarily another shifter.

Figure 1B:
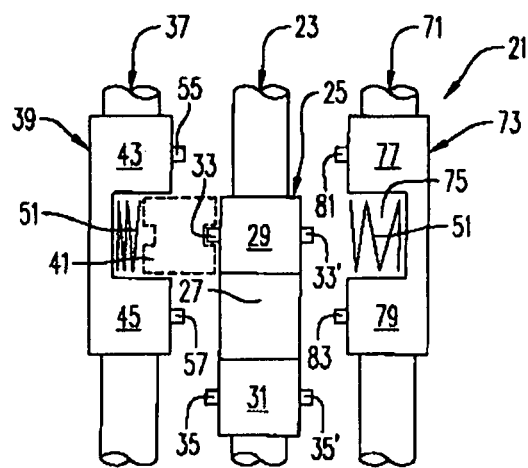
Figure 1C:
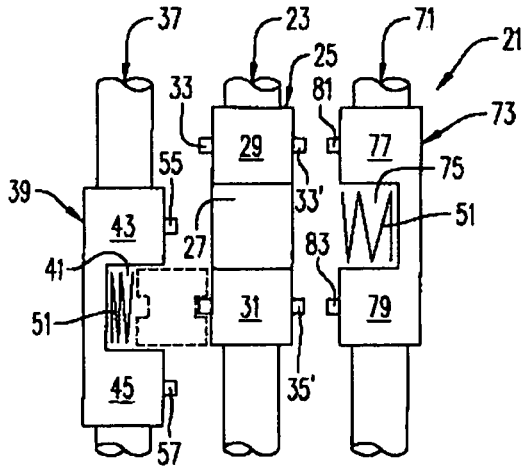

Referring for purposes of discussion to the embodiment of FIGS. 1A-1I, the shift lever 47 is adapted to move the second rail 37 between a second rail forward position, as seen in FIG. 1B, and a second rail rear position, as seen in FIG. 1C, when the engaging portion 49 is in the second slot 41. The second rail forward position and the second rail rear position might correspond, for example, to gears 1 and 2 of the transmission. The engaging portion 49 of the shift lever 47 can be engageable with the first forward engagement member 33 when the second rail 37 is in the second rail forward position (FIG. 1B) and the engaging portion can be engageable with the first rear engagement member 35 when the second rail is in the second rail rear position (FIG. 1C). As seen in the figures, the first forward and rear engagement members 33 and 35 can comprise protrusions and the engagement portion 49 on the shift lever can comprise a recess 50 for receiving the protrusions. Of course, as one of various possible alternatives, the engagement portion on the shift lever can comprise a protrusion and the engagement members on the ears of the shifter can comprise recesses for receiving the protrusion. It will be appreciated that a variety of structures can accomplish the function of engaging the engaging members with the engaging portion.

When the engaging portion 49 is engaged with an engaging member 33 or 35, the transmission 21 will tend to stay in the gear corresponding to the position to which the shift lever 47 has moved the engaging portion. A biasing member 51 can be provided for urging the engaging portion 49 into engagement with either of the first forward or rear engagement members 33 or 35. The biasing member 51 can comprise what shall be denominated a piston member disposed in the second slot 41. The term piston member will be understood to comprise a variety of structures adapted to contact the engaging portion 49 in order to urge the engaging portion toward an engaging member and is does not necessarily require a piston head or other structure commonly associated with pistons, and may comprise or consist essentially of structures such compressible resilient members such as springs, and piston or piston-like members associated with pneumatic, hydraulic, or electromagnetic drivers.

Figure 1D:
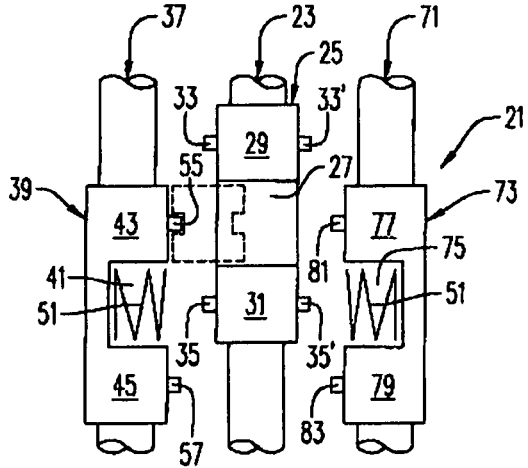
Figure 1E:
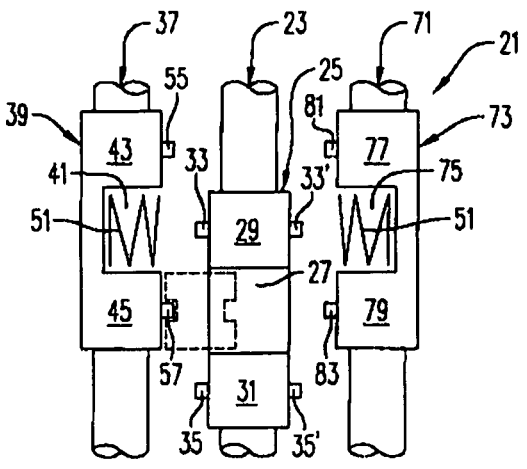
Figure 1F:
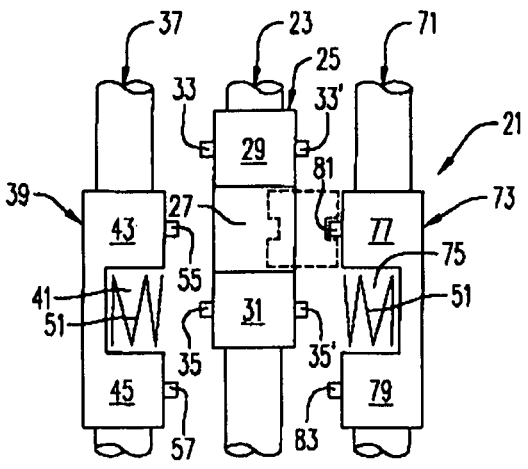

As seen in FIGS. 1D and 1E, the shift lever 47 is adapted to move the first rail 23 between a first rail forward (FIG. 1D) and a rear (FIG. 1E) position when the engaging portion 49 is in the first slot 27. Second forward and rear engagement members 55 and 57 can be provided on the second forward and rear ears 43 and 45 of the second shifter 39. The engaging portion 49 can be adapted to engage with the second forward engagement member 55 when the first rail 23 is in the first rail forward position (FIG. 1D) and the engaging portion can be adapted to engage with the second rear engagement member 57 when the first rail is in the first rail rear position (FIG. 1E).

Figure 5:
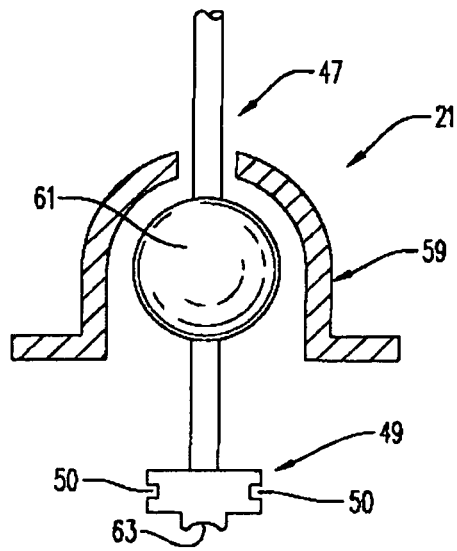
FIG. 5 is a schematic, partially cross-sectional side view of a shift tower portion of a gearshift locking arrangement according to an embodiment of the present invention.

As seen in the embodiment shown in FIG. 3, in some circumstances, a biasing member 151 can be provided in the first slot 127 for urging the engaging portion 149 into engagement with either of the second forward or rear engagement members 155 or 157. As the embodiment shown in FIGS. 1A-1I will ordinarily permit the engaging portion 49 to pass entirely through the slot 27 in the first shifter 25, another arrangement may be used as it may be inconvenient to arrange a biasing member 51 of the type that can be disposed in the second slot 41 for biasing the engaging portion. FIG. 5 shows a shift lever 47 pivotably mounted in a shift tower 59 about a pivot point 61. The engaging portion 49 is disposed at the bottom of the shift lever 47.

Figure 6A:
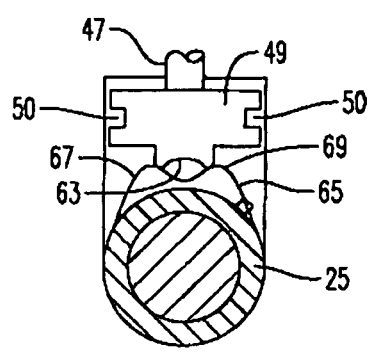
FIGS. 6A-6B are schematic, partially cross-sectional end views of a portion of a gearshift locking arrangement according to an embodiment of the present invention.
Figure 6B:
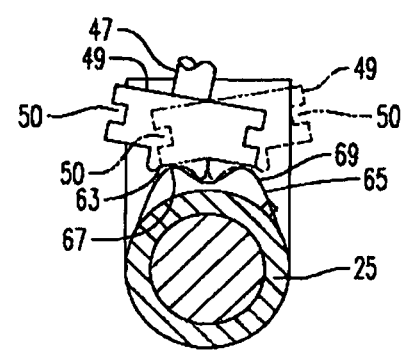

As seen in FIGS. 6A and 6B, arrangements such as a detent arrangement associated with the first shifter 25 can be used for retaining the engaging portion 49 in engagement with either of the second forward or rear engagement members 55 or 57. The illustrated detent arrangement includes a recess or notch 63 in the bottom of the engaging portion and an essentially upside-down "W"-shaped leaf spring 65 or similarly resilient member defining left and right protrusions 67 and 69, respectively, secured to the shifter 25. When a driver wishes to retain the engaging portion 49 in engagement with either of the second forward or rear engagement members 55 or 57, the driver can depress the leaf spring 65 so that the left protrusion 67 is received in the notch 63 in the bottom of the engaging portion. The protrusions 67 and 69 and notch 63 can be sized so that, when a protrusion is received in the notch, the protrusion can be moved out of the notch, and the engaging portion can be moved out of engagement with the second forward or rear engagement member 55 or 57, only by positive application of force by the driver to disengage the protrusion and notch.

Figure 1G:
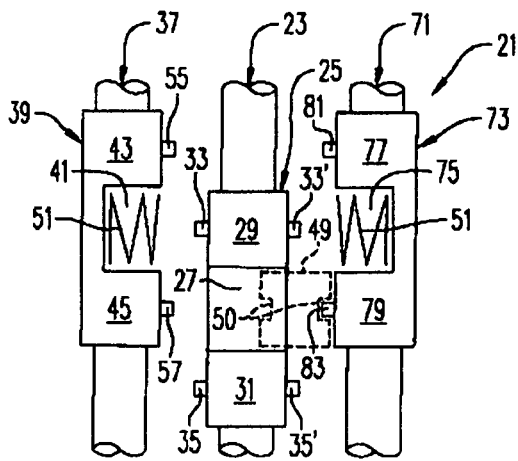
Figure 1H:
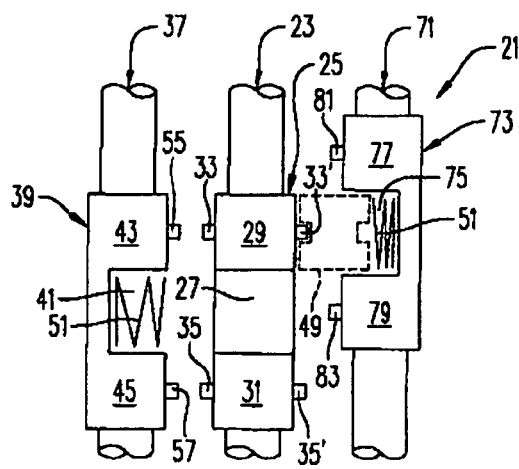
Figure 1I:
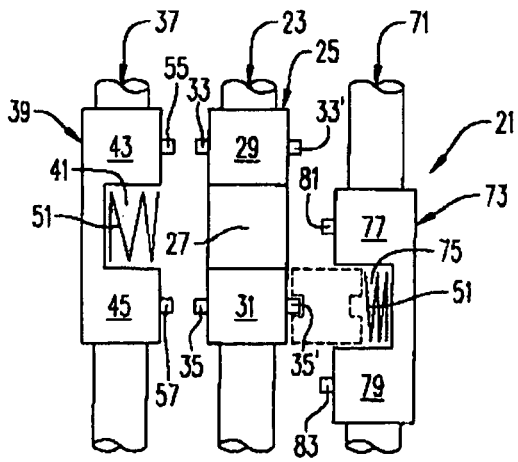

The manual transmission 21 of FIGS. 1A-1I also comprises a third rail 71 on a right side of the first rail 23, the second rail 37 being disposed on a left side of the first rail. The third rail 71 has a third shifter 73 having a third slot 75 between third forward and rear ears 77 and 79 of the third shifter. The first rail has first forward and rear engagement members 33, 33' and 35, 35' on left and right sides of the first forward and rear ears 29 and 31 of the first shifter 25. The engaging portion 49 of the shift lever 47 is movable between the first slot 27 and the third slot 75. The shift lever 47 is adapted to move the third rail 71 between a third rail forward (FIG. 1H) and rear (FIG. 1I) position when the engaging portion 49 is in the third slot 75. The engaging portion 49 is engageable with the right-side first forward engagement member 33' when the third rail 71 is in the third rail forward position (FIG. 1H) and the engaging portion engageable with the right-side first rear engagement member 35' when the third rail is in the third rail rear position (FIG. 1I).

The shift lever 47 is adapted to move the first rail 23 between the first rail forward (FIG. 1D) and rear (FIG. 1E) position when the engaging portion 49 is in the first slot 27. In addition to the second forward and rear engagement members 55 and 57 provided on the second forward and rear ears 43 and 45 of the second shifter 39, third forward and rear engagement members 81 and 83 can be provided on the third forward and rear ears 77 and 79 of the third shifter 73. When the engaging portion 49 moves the first rail 23 to the first rail forward position the engaging portion can be engaged with either one of the second forward engagement member 55 (FIG. 1D) and the third forward engagement member 81 (FIG. 1F) and, when the engaging portion moves the first rail to the first rail rear position, the engaging portion can be engaged with either one of the second rear engagement member 57 (FIG. 1E) and the third rear engagement member 83 (FIG. 1G).

When a driver wishes to retain the engaging portion 49 in engagement with either of the third forward or rear engagement members 81 or 83, the driver can depress the leaf spring 65 so that the right protrusion 69 is received in the notch 63 in the bottom of the engaging portion (shown in phantom in FIG. 6B). The protrusions 67 and 69 and notch 63 can be sized so that, when a protrusion is received in the notch, the protrusion can be moved out of the notch, and the engaging portion can be moved out of engagement with the second forward or rear engagement member 55 or 57, only by positive application of force by the driver to disengage the protrusion and notch.

The manual transmission 21 with a gearshift locking arrangement shown in FIGS. 1A-1I can be used in conjunction with a gearshift pattern P as shown in FIG. 2. When the gearshift 47 (FIG. 5) is in the N position shown in FIG. 2, the engaging portion 49 can be in the position shown in FIG. 1A. When the gearshift 47 is in the "1" position, e.g., first gear, in FIG. 2, the engaging portion 49 can be in the second rail forward position shown in FIG. 1B. When the gearshift 47 is in the "2" position, e.g., second gear, in FIG. 2, the engaging portion 49 can be in the second rail rear position shown in FIG. 1C. When the gearshift 47 is in the "3" position, e.g., third gear, in FIG. 2, the engaging portion 49 can be in the first rail forward position shown in FIG. 1D or 1F. When the gearshift 47 is in the "4" position, e.g., fourth gear, in FIG. 2, the engaging portion 49 can be in the first rail rear position shown in FIG. 1E or 1G. When the gearshift 47 is in the "5" position, e.g., fifth gear, in FIG. 2, the engaging portion 49 can be in the third rail forward position shown in FIG. 1H. When the gearshift 47 is in the "R" position, e.g., reverse gear, in FIG. 2, the engaging portion 49 can be in the third rail rear position shown in FIG. 1I.

Another embodiment of a manual transmission 121 with a gearshift locking arrangement is shown in FIG. 3 and can include a first rail 123 having a first shifter 125 having a first slot 127 between first forward and rear ears 129 and 131 of the shifter, with the rail being movable between first rail forward and rear positions. A second rail 137 has a second shifter 139 with a second slot 141 between second forward and rear ears 145 and 145. First forward and rear engagement members 133 and 135 can be provided, usually on the first forward and rear ears 129 and 131, at positions corresponding to second rail forward and rear positions, and second forward and rear engagement members 155 and 157 can be provided, usually on the second forward and rear ears, at positions corresponding to first rail forward and rear positions.

A shift lever having an engaging portion 149 can be adapted to be disposed in either the first or second slot 127 or 141 and the shift lever can be adapted to move the first or second rails between the first and second rail forward and rear positions when in the first or second slots, respectively. The engaging portion 149 can be engaged with the second forward engagement member 155 when the first rail 123 is in the first rail forward position and the engaging portion can be engaged with the second rear engagement member 157 when the first rail is in the first rail rear position. The engaging portion 149 can be engaged with the first forward engagement member 133 when the second rail 137 is in the second rail forward position and the engaging portion can be engaged with the first rear engagement member 135 when the second rail is in the second rail rear position. Usually, when the engaging portion 149 is in one of the first and second rail forward or rear positions, the manual transmission will be in one of four working gears and, when the engaging portion is in between any of the rail forward or rear positions, such as is shown in FIG. 3, the manual transmission can be in a neutral gear. A biasing member 151 can be provided in the slots 127 and 141 to keep the engaging portion 149 in engagement with the one of the forward and rear engagement members 133 and 135 or 155 and 157.

FIG. 4 shows another manual transmission 221 with a gearshift locking arrangement. The manual transmission 221 comprises a rail 223 having a shifter 225 having a slot 227 between forward and rear ears 229 and 231 of the shifter. The rail 223 is movable between rail forward and rear positions which will ordinarily correspond to working gear positions. Forward and rear engagement members 255 and 257 disposed at positions corresponding to the rail forward and rear positions. The forward and rear engagement members 255 and 257 can be mounted on any suitable structures. A shift lever with an engaging portion 249 that is adapted to be disposed in the slot 227 can be provided to move the rail 223 between the rail forward and rear position. The engaging portion 249 can be engaged with the forward engagement member 255 when the rail 223 is in the rail forward position and the engaging portion can be engaged with the rear engagement member 257 when the rail is in the rail rear position. A biasing member 251 can be provided in the slot 227 to keep the engaging portion 249 in engagement with the one of the forward and rear engagement members 255 and 257.

It will be appreciated that the present invention is not limited to gearshift mechanisms having one, two, or three shifter rails and that the present invention has application in gearshift mechanisms having any number of shifter rails.

In a method of operating a gearshift mechanism 21 according to an embodiment of the present invention as shown in FIGS. 1A-1I, an engaging portion 49 of a shift lever 47 is moved between a first slot 27 in a first shifter 25 of a first rail 23, the first slot being disposed between first forward and rear ears 29 and 31 of the first shifter, and a second slot 41 in a second shifter 39 of a second rail 37, the second slot being disposed between second forward and rear ears 43 and 45 of the second shifter. When the engaging portion 49 is in the second slot 41, using the shift lever 47, the second rail 37 can be moved either forwardly and rearwardly relative to the first rail 23. When the second rail 37 is moved forwardly, the first forward engagement member 33 provided on the first forward ear 29 of the first shifter 25 can be engaged with the engaging portion 49 and, when the second rail is moved rearwardly, the first rear engagement member 35 provided on the first rear ear 31 of the first shifter can be engaged with the engaging portion. The engaging portion 49 can be retained in the engagement with the first forward or rear engagement member 33 or 35 by means such as a biasing member 51 that urges the engaging portion to stay in engagement with the engagement member.

Similarly, using the shift lever 47, when the engaging portion 49 is in the first slot 27, the first rail 23 can be moved either forwardly or rearwardly relative to the second rail 37. When the first rail 23 is moved forwardly, the second forward engagement member 55 provided on the second forward ear 43 of the second shifter 39 can be engaged with the engaging portion 49 and, when the first rail is moved rearwardly, the second rear engagement member 57 provided on the second rear ear 45 of the second shifter can be engaged with the engaging portion. Alternatively, using the shift lever 47, when the engaging portion 49 is in the first slot 27, the first rail 23 can be moved either forwardly or rearwardly relative to the third rail 71. When the first rail 23 is moved forwardly, the third forward engagement member 81 provided on the third forward ear 77 of the third shifter 73 can be engaged with the engaging portion 49 and, when the first rail is moved rearwardly, the third rear engagement member 83 provided on the third rear ear 79 of the third shifter can be engaged with the engaging portion. When engaged with second or third forward or rear engagement members, the engaging portion 49 can be retained in engagement by any suitable arrangement such as the detent arrangement shown in FIGS. 6A-6B provided by the W-shaped leaf spring 65 on the first shifter 25 and the notch 63 provided in the engaging portion.

Similarly, using the shift lever 47, when the engaging portion 49 is in the third slot 73, the third rail 71 can be moved either forwardly or rearwardly relative to the first rail 23. When the third rail 71 is moved forwardly, the first forward engagement member 33' provided on the right side of the first forward ear 29 of the first shifter 25 can be engaged with the engaging portion 49 and, when the third rail is moved rearwardly, the first rear engagement member 35' provided on the right side of the first rear ear 35' of the second shifter can be engaged with the engaging portion. The engaging portion 49 can be retained in the engagement with the first forward or rear engagement member 33' or 35' by means such as a biasing member 51 that urges the engaging portion to stay in engagement with the engagement member.

Ordinarily, in all embodiments, once the transmission is locked in gear by moving the engaging portion of the shift lever into a slot on a rail and moving the rail forwardly or rearwardly, and the engaging portion engages with an engagement member, a conventional interlock mechanism (not shown) is used to prevent movement of the other rails. Since the interlock prevents the rail of the adjacent shifter from moving, as long as the lever is engaged with the pin, the transmission will remain in gear.

While engagement between engagement members and the engaging portion of the shift lever has been described in conjunction with protrusions and recesses, it will be appreciated that the protrusions and recesses may be of the size that do not require substantial driver effort to disengage. For example, the protrusions and recesses may be provided with sloped sides to facilitate engagement and disengagement when a driver pulls the gearshift lever backward or pushes the gearshift lever forward. Similarly, the retention force provided by the W-shaped leaf spring and recess arrangement contemplated as one means for retaining a gearshift engaging portion in engagement with engagement members will ordinarily be of a magnitude that is relatively easily overcome by a driver to permit easy engagement and disengagement. How much driver effort is appropriate to overcome a retention force will ordinarily vary from vehicle to vehicle, often depending upon factors such as the intended use of the vehicle. Obviously, the retention forces should ordinarily be sufficient to prevent disengagement of the gearshift during normal intended operations of the particular vehicle.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A manual transmission with a gearshift locking arrangement, comprising:
    a first rail having a first shifter having a first slot between first forward and rear ears of the first shifter, first forward and rear engagement members in the form of one of protrusions and protrusion receiving recesses being provided on the first forward and rear ears of the first shifter;
    a second rail having a second shifter having only a single slot consisting of a second slot between second forward and rear ears of the second shifter; and
    a shift lever, an engaging portion of the shift lever being movable between the first slot and the second slot, the shift lever being adapted to move the second rail between a second rail forward and rear position when the engaging portion is in the second slot, the engaging portion comprising at least one of a protrusion receiving recess and a protrusion for engaging with the first forward engagement member when the second rail is in the second rail forward position and with the first rear engagement member when the second rail is in the second rail rear position; and
    at least one of a compressed resilient member, hydraulic pressure, pneumatic pressure, and an electromagnet provided to urge the engaging portion into engagement with either of the first forward or rear engagement members.

2. The manual transmission with a gearshift locking arrangement as set forth in claim 1, comprising a piston member disposed in the second slot, the at least one of the compressed resilient member, hydraulic pressure, pneumatic pressure, and electromagnet being arranged to urge the piston against the shift lever.

3. The manual transmission with a gearshift locking arrangement as set forth in claim 1, wherein the shift lever is adapted to more the first rail between a first rail forward and a rear position when the engaging portion is in the first slot.

4. The manual transmission with a gearshift locking arrangement as set forth in claim 3, comprising second forward and rear engagement members provided on the second forward and rear ears of the second shifter, the engaging portion being engageable with the second forward engagement member when the first rail is in the first rail forward position and the engaging portion being engageable with the second rear engagement member when the first rail is in the first rail rear position.

5. The manual transmission with a gearshift locking arrangement as set forth in claim 4, comprising at least one of a compressed resilient member, hydraulic pressure, pneumatic pressure, and an electromagnet provided to urge the engaging portion into engagement with either of the first forward or rear engagement member and at least another one of a compressed resilient member, hydraulic pressure, pneumatic pressure, and an electromagnet provided to urge the engaging portion into engagement with either of the second forward or rear engagement members.

6. The manual transmission with a gearshift locking arrangement as set forth in claim 4, comprising a detent arrangement for retaining the engaging portion in engagement with either of the second forward or rear engagement members.

7. The manual transmission with a gearshift locking arrangement as set forth in claim 6, wherein the detent arrangement comprises a resilient member associated with the first slot and adapted to engage with a notch in the shift lever.

8. The manual transmission with a gearshift locking arrangement as set forth in claim 1, comprising a third rail on a right side of the first rail, the second rail being disposed on a left side of the first rail, the third rail having a third shifter having a third slot between third forward and rear ears of the third shifter, wherein the first rail has first forward and rear engagement members on left and right sides of the first forward and rear ears of the tint shifter, and the engaging portion of the shift lever being movable between the first slot and the third slot, the shift lever being adapted to move the third rail between a third rail forward and rear position when the engaging portion is in the third slot, the engaging portion being engageable with the right-side first forward engagement member when the third rail is in the third rail forward position and the engaging portion being engageable with the right-side first rear engagement member when the third rail is in the third rail rear position.

9. The manual transmission with a gearshift locking arrangement as set forth in claim 8, wherein the shift lever is adapted to move the first rail between a first rail forward and a rear position when the engaging portion is in the first slot.

10. The manual transmission with a gearshift locking arrangement as set forth in claim 9, comprising second forward and rear engagement members provided on the second forward and rear ears of the second shifter, and third forward and rear engagement members provided on the third forward and rear ears of the third shifter, the engaging portion being engageable with at least one of the second forward engagement member and the third forward engagement member when the first rail is in the first mil forward position and the engaging portion being engageable with at least one of the second rear engagement member and the third rear engagement member when the first rail is in the first rail rear position.

11. The manual transmission with a gearshift locking arrangement as set forth in claim 10, comprising a detent arrangement for retaining the engaging portion in engagement with any of the second forward or rear engagement members and the third forward or rear engagement members.

12. The manual transmission with a gearshift locking arrangement as set forth in claim 11, wherein the detent arrangement comprises a resilient member associated with the first slot and adapted to engage with a notch in the shift lever.

13. The manual transmission with a gearshift locking arrangement as set forth in claim 1, wherein the at least one of the protrusion receiving recess and the protrusion engage with the first forward engagement member when the second rail is in the second rail forward position and with the first rear engagement member when the second rail is in the second rail rear position while the engaging portion is in the second slot.

14. A method of operating a gearshift mechanism, comprising:
moving an engaging portion of a shift lever between a first slot in a first shifter of a first rail, the first slot being disposed between first forward and rear ears of the first shifter, and a second slot in a second shifter of a second rail, the second slot being disposed between second forward and rear ears of the second shifter and the second shifter having only a single slot consisting of the second slot, the engaging portion comprising at least one of a protrusion receiving recess and a protrusion;
using the shift lever, moving the second rail one of forwardly and rearwardly relative to the first rail; and
when the second rail is moved forwardly, engaging with the engaging portion a first forward engagement member provided on the first forward ear of the first shifter and, when the second rail is moved rearwardly, engaging with the engaging portion a first rear engagement member provided on the first rear ear of the first shifter the forward engagement member, the rear engagement member being in the form of one of protrusions and protrusion receiving recesses for engaging with the engaging portion, by urging the engaging portion into engagement with either of the first forward or rear engagement members with at least one of a compressed resilient member, hydraulic pressure, pneumatic pressure, and an electromagnet.

15. The method as set forth in claim 14, comprising, using the shift lever, moving the first rail one of forwardly and rearwardly relative to the second rail; and
when the first rail is moved forwardly, engaging with the engaging portion a second forward engagement member provided on the second forward ear of the second shifter and, when the first rail is moved rearwardly, engaging with the engaging portion a second rear engagement member provided on the second rear ear of the second shifter.

16. The method as set forth in claim 14, wherein the at least one of the protrusion receiving recess and the protrusion engage With the first forward engagement member when the second rail is in the second rail forward position. and with the first rear engagement member when the second rail is in the second rail rear position while the engaging portion is in the second slot.

* * * * *